(12) United States Patent
Forssell et al.

(10) Patent No.: US 8,174,994 B2
(45) Date of Patent: May 8, 2012

(54) SELECTION OF A COMMUNICATION INTERFACE

(75) Inventors: Mika Forssell, Espoo (FI); Mika Liljeberg, Helsinki (FI); Ari Kontio, Espoo (FI)

(73) Assignee: Nokia Corporation, Espoo (FI)

( * ) Notice: Subject to any disclaimer, the term of this patent is extended or adjusted under 35 U.S.C. 154(b) by 897 days.

(21) Appl. No.: 11/403,884

(22) Filed: Apr. 14, 2006

(65) Prior Publication Data

US 2006/0259951 A1 Nov. 16, 2006

(30) Foreign Application Priority Data

Apr. 21, 2005 (GB) .................................. 0508057.7

(51) Int. Cl.
*H04L 12/26* (2006.01)
(52) U.S. Cl. ........................................ 370/252; 370/465
(58) Field of Classification Search .................. 370/252, 370/253, 465, 466, 467, 216, 217, 218, 227, 370/228, 221, 334, 338, 349
See application file for complete search history.

(56) References Cited

U.S. PATENT DOCUMENTS

| | | | | |
|---|---|---|---|---|
| 5,898,667 | A * | 4/1999 | Longfield et al. | 370/225 |
| 6,674,769 | B1 * | 1/2004 | Viswanath | 370/469 |
| 7,065,367 | B2 * | 6/2006 | Michaelis et al. | 455/452.2 |
| 7,610,057 | B2 * | 10/2009 | Bahl et al. | 455/522 |
| 2002/0046292 | A1 * | 4/2002 | Tennison et al. | 709/238 |
| 2002/0177466 | A1 | 11/2002 | Laurila et al. | |
| 2004/0174853 | A1 | 9/2004 | Saito et al. | |
| 2004/0192306 | A1 * | 9/2004 | Elkarat et al. | 455/435.2 |
| 2005/0238046 | A1 * | 10/2005 | Hassan et al. | 370/465 |

FOREIGN PATENT DOCUMENTS

| | | |
|---|---|---|
| EP | 1237328 A2 | 9/2002 |
| EP | 1519615 | 3/2005 |
| JP | 2002-112347 A | 4/2002 |
| JP | 2002-261857 A | 9/2002 |
| WO | WO 02/01807 A2 | 1/2002 |
| WO | WO 02/41580 | 5/2002 |
| WO | WO 2004/021717 | 3/2004 |
| WO | WO 2004/031488 | 4/2004 |
| WO | WO 2005/004437 | 1/2005 |

OTHER PUBLICATIONS

Japanese Office Action, Japanese Patent Application No. 200680019906.1, Issuing Date: Aug. 4, 2010, pp. 1-8, English Translation: pp. 1-11.
Chinese Office Action, Chinese Patent Application No. 200680019906.1, Issuing Date: Aug. 4, 2010, pp. 1-8, English Translation: pp. 1-11.
Japanese Office Action, Japanese Patent Application No. 2008-507196, Date: Sep. 21, 2010, pp. 1-3, English Translation: pp. 1-2.

\* cited by examiner

*Primary Examiner* — Gary Mui
(74) *Attorney, Agent, or Firm* — Squire Sanders (US) LLP (57) ABSTRACT

A data processing mechanism is disclosed for selection of a communication interface for a communication device from a plurality of communication interfaces provided by a communication system. The mechanism comprises a first controller entity for executing a first selection routine for considering at least one first policy on communication via the communication system, and a second controller entity for executing a second selection routine for considering at least one second policy on communication via the communication system. The at least one second policy is related to a different aspect of communication than the at least one first policy. The data processing mechanism is configured to select the communication interface based on outputs of the first selection routine and the second selection routine.

36 Claims, 3 Drawing Sheets

SELECTION OF A COMMUNICATION INTERFACE

FIELD OF THE INVENTION

The present invention relates to selection of an appropriate communication interface for communication via a communications system.

BACKGROUND OF THE INVENTION

A communications system is a facility which enables communication between two or more entities such as user terminal equipment (mobile or fixed) or other communication device, network entities and other nodes. The communication may comprise, for example, communication of voice, electronic mail (email), text messages, data, multimedia and so on.

An appropriate communications network provides a user with an access to the communications system. A communication device of the user may be capable of accessing a communications system by means of a plurality of different access networks, this requiring that the communication device is compatible with different access technologies.

A communications network typically operates in accordance with a given standard or with a given set of specifications which set out what the various elements of a system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the communication networks is typically based on a pre-defined communication protocol. In other words, a specific set of "rules" on which the communication can be based needs to be defined to enable the user equipment to communicate via the communications system.

An access interface may be provided by a fixed line or wireless communication interface. Communication systems providing wireless access enable at least some degree of mobility for the users thereof. More advanced mobility support can typically be added as an enhanced feature. An example of communication networks providing wireless access is a public land mobile network (PLMN), such as the second generation (2G) GSM (Global System for Mobile communications), the so called 2.5 generation GPRS (General Packet Radio Service) or the third generation (3G) WCDMA (Wideband Code Division Multiple Access) or EDGE (Enhanced Data for GSM Evolution). The public land mobile networks (PLMN) are commonly based on cellular technology. In cellular systems, a base transceiver station (BTS) or similar access entity services mobile communication device or user equipment (UE) via a wireless interface between these entities. The communication on the wireless interface between the user equipment and elements of the communication network can be based on an appropriate communication protocol. The operation of the base station apparatus and other apparatus required for the communication can be controlled by one or several control entities. Other examples of wireless access technologies include various wireless local area networks (WLANs) and satellite based systems.

Examples of fixed line access technologies include public switched telephone networks (PSTN), cable networks, digital subscriber line (DSL) networks, and so on.

The various control entities of a communication system may be interconnected. One or more gateway nodes may be provided for connecting an access network to other communication networks, for example to an IP (Internet Protocol) and/or other packet switched data networks. In such arrangements, the communications network provides an access network enabling a user with appropriate user equipment to access external networks, hosts, or services offered by specific service providers.

In a packet data network, a packet data carrier or bearer may be established to carry traffic flows over the network. An example of such a packet data carrier is a packet data protocol (PDP) context in current GPRS, EGPRS and WCDMA networks.

Conventional mobile terminals may support only cellular access technology for data communication, and usage of data in those mobile terminals is relatively simple. For example, in response to a user launching a data application a pre-defined GSM data connection, a GSM based EDGE data connection, or a WCDMA data connection or similar may be created.

More sophisticated user equipments provided with multi-radio capabilities may access services provided via the communications system via a number of access network technologies. For example, a mobile device may connect to services provided via the communications system by setting up a PDP context on an EDGE network of a 3G access network, or by setting up a connection through a non-cellular complementary access system, for example a WLAN.

This means new opportunities for data transfer, for example for applications like Voice over the IP (VoIP). On the other hand, this also causes new challenges, for example, because of introduction of mobile applications that need to be processed by the cellular and non-cellular systems with changing characteristics for the access, for example the bitrate, cost, coverage and so on. For example, cellular coverage is typically provided nationally whereas WLAN coverage is only provided in small hot spots. Therefore cellular connectivity should work all the time but non-cellular systems, for example the WLAN, provide only temporary and local connectivity. Because of the different nature of the access systems substantially different features such as networking protocols and applications may be used by the different access technologies.

The number of increased access technologies, the temporary availability of some access technologies, for example the WLAN, and variety of applications with different requirements increase mobile terminal usage complexity and might lead to under-usage of network potential. For example, it may turn out to be laborious to try to activate a WLAN connection because a user might not know where a WLAN hotspot is available.

If decisions that relate to connectivity are not automated, usage of mobile terminals may become fairly complex, thus hindering utilization of the potential different connectivity technologies may offer. For example, a user may wish to use a WLAN access for email communication when there is no WLAN facility available. In such situation the user may stay on a GPRS (General Packet Radio Service) network for a considerable time, even for days, unless he/she continuously checks for the availability of a WLAN network or similar. If the connectivity decision is automated, the mobile communication device could automatically switch to a WLAN network after detection that such a network has become available.

However, if a mobile terminal is enabled to select an access technology automatically, then other problems may arise. This may be the case especially in association with protocols used in different networks to access services. For example, although a set of protocols might be enough when using a GPRS connection, another set of protocols might be needed when using a WLAN connection. If the WLAN access is provided by a WLAN network that does not offer enabled security features better security may be required on IP level (like IPsec) to prevent evesdropping. An average user may have difficulties if he/she tries to manage all the required settings manually. Therefore it might be advantageous to have an improved mechanism for selection of a communication interface.

SUMMARY OF THE INVENTION

In accordance with an embodiment there is provided a data processing mechanism for selection of a communication interface for a communication device from a plurality of communication interfaces provided by a communication system. The mechanism comprises a first controller entity for executing a first selection routine for considering at least one first policy on communication via the communication system, and a second controller entity for executing a second selection routine for considering at least one second policy on communication via the communication system. The at least one second policy is related to a different aspect of communication than the at least one first policy. The data processing mechanism is configured to select the communication interface based on outputs of the first selection routine and the second selection routine.

Another embodiment provides a method for automated selection of a communication interface for a communication device from a plurality of communication interfaces provided by a communication system. In the method a first selection routine adapted to consider at least one first policy on communication via the communication system is executed. In addition to the first routine, a second selection routine adapted to consider at least one second policy on communication via the communication system is executed, the at least one second policy being related to a different aspect of communication than the at least one first policy. A communication interface is then selected based on outputs of the first selection routine and the second selection routine.

In a more specific embodiment the data processing mechanism comprises a third controller entity for executing a third selection routine. The third routine may be for considering at least one third policy on communication via the communication system, the at least one third policy being related to a different aspect of communication than the at least one first policy and the at least one second policy. The data processing mechanism may then decide the communication interface based on the output of the third selection routine.

One of the selection routines may be for considering at least one policy on communication protocols, and/or on flow requirements. One of the selection routines may be for considering at least one policy on access interfaces, and another one of the selection routines may be adapted to consider parameters that associate with the communication device.

One of the controller entities may be configured to request another one of the controller entities to activate a communication interface.

A controller entity may be configured to notify another controller entity of a selected communication interface, and to route application data to yet another controller entity.

One of the controller entities may be configured to monitor for availability of a communication interface, and to notify at least one other of the controller entities of an available communication interface.

The data processing mechanism may be provided in a communication device, for example in a mobile terminal or another mobile communication device.

The data processing mechanism may be provided by means of a program code product.

The embodiments of the invention may provide various advantages, including, but not limited to enhanced mobile terminal usability, efficient utilization of available access technologies, efficient utilization of terminal resources, for example battery, processors, for example the central processing unit (CPU) of the communication device, and memory capacities, and so forth. The embodiments may provide an efficient tool for a user equipment to automatically select an access technology and connectivity for a connection.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS IN THE PRESENT INVENTION

To assist in understanding the invention, an explanation of a possible underlying communication system is given first with reference to elements as defined by the third generation partnership project (3GPP) and a WLAN system. It is noted that although certain embodiments will now be described by way of example, with reference to the exemplifying architectures of a cellular communication system comprising at least one 3GPP mobile communication network and of a wireless local area network, embodiments may be applied to any other suitable forms of communication systems than those illustrated and described herein. It is also noted that in the description below the term interface is understood to refer to an access technology. For example, the available interfaces may be based on access technologies such as GSM, GPRS, EDGE, WCDMA, CDMA, WLAN, UWB (Ultra Wide Band), or short range links such as the Bluetooth™ (a short range radio link), WiMax (Worldwide Interoperability for Microwave Access), or the Rfid (radio frequency identification; an infrared link) and so forth.

Figure 1:
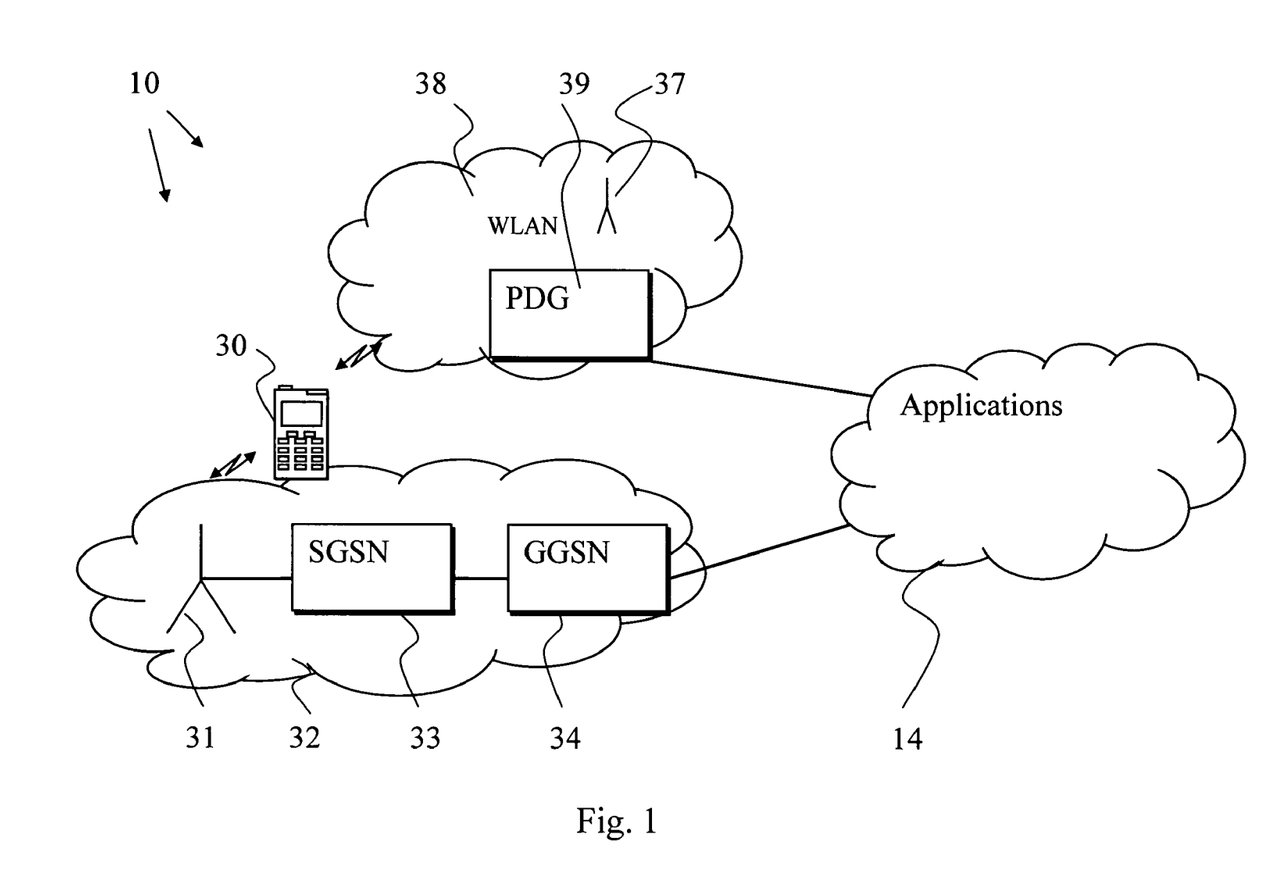
FIG. 1 shows a schematic view of a communications system comprising a plurality of networks.

A mobile device may use various applications based on appropriate protocols, for example the mobile IP protocol. In FIG. 1 the applications available for mobile devices are shown by a cloud 14 for simplicity. The applications may be provided, for example, by means of the Internet, and thus the cloud 14 can be understood as, for example, denoting an IP based data network system.

A cellular system is typically arranged to serve a plurality of mobile user equipment, via a wireless interface between the user equipment and base stations of the communication system. In FIG. 1, some elements of a mobile communication network 32 are shown. The cellular communication network provides packet switched data transmission in the packet switched domain between a support node 33 and a mobile device 30. The network 32 in turn is connected to external data networks, for example the Internet, via a gateway GPRS support node (GGSN) 34. The GPRS service allows transmission of packet data between mobile communication devices and external data networks. In addition to at least one gateway, a 3G network typically comprises also a number of packet data service nodes (SN). In the shown embodiment, the service node is provided by a serving GPRS support nodes (SGSN) 33. Each of nodes 33 is connected to at least one mobile access network, typically to a base station system 31. The base station 31 is arranged to transmit signals to and receive signals from the mobile device 30, via respective wireless interfaces. Correspondingly, each mobile device is able to transmit signals to and receive signals from the base stations via the wireless interface.

A mobile device within a radio access network may communicate with a radio network controller via radio network channels which are typically referred to as radio bearers. Each mobile device such as a mobile user equipment may have one or more radio channels open at any one time with the radio network controller. For example, a user may access the cellular network by means of communication devices such as a personal computer, personal data assistant (PDA), mobile station (MS), portable computer, combinations thereof or the like.

The mobile device can be used for various tasks such as making and receiving phone calls, for receiving and sending data from and to a network and for experiencing, for example, multimedia or other content. The communication device is typically provided with a processor and memory for accomplishing these tasks. The operation of the user equipment may be controlled by means of a suitable user interface such as key pad, voice commands, touch sensitive screen or pad, combinations thereof or the like.

Overall communication between user equipment in an access entity and the GGSN of a cellular network can be provided by a PDP (packet data protocol) context. Each PDP context provides a communication pathway between a particular user equipment and a GGSN. Each PDP context identifies the characteristics of data to be transferred, for example quality of service (QoS), to be transferred in the PDP context. Once the PDP context is established, it can typically carry multiple flows having similar enough data transfer characteristics. Each flow normally represents, for example, a particular service and/or media component of a particular service. The PDP context therefore often represents a logical communication pathway for one or more flows across the cellular network. To implement the PDP context between user equipment and the serving GPRS support node, radio access bearers need to be established which commonly allow for data transfer for the user equipment. A user equipment may have one or more active PDP contexts at a time.

FIG. 1 shows also a WLAN network 38. In addition to a PDP context provided by network 32, the mobile device 30 may access the communication system via the WLAN 38. The WLAN is an example of an access technology that provides radio access to another system, for example an IP network, another device and so forth. It is noted that no IP based communications is necessarily required but some other protocol may be used instead. Each WLAN is provided with at least one access point 37 and a packet data gateway 39. The data carrier can be provided by means of a number of protocols. For example, when accessing an IP network and services provided in the IP network, the IP protocol is used to carry data, UpnP (Universal plug and play) may be used to discover devices and services, and so on. IP security may be enhanced by using a so called IPsec tunnel. Internet Key Exchange (IKEv2) signalling may be used to negotiate and manage IPsec tunnels between the mobile device 30 and the packet data gateway 39. The packet data gateway 39 may connect the WLAN to network 14.

Figure 2:
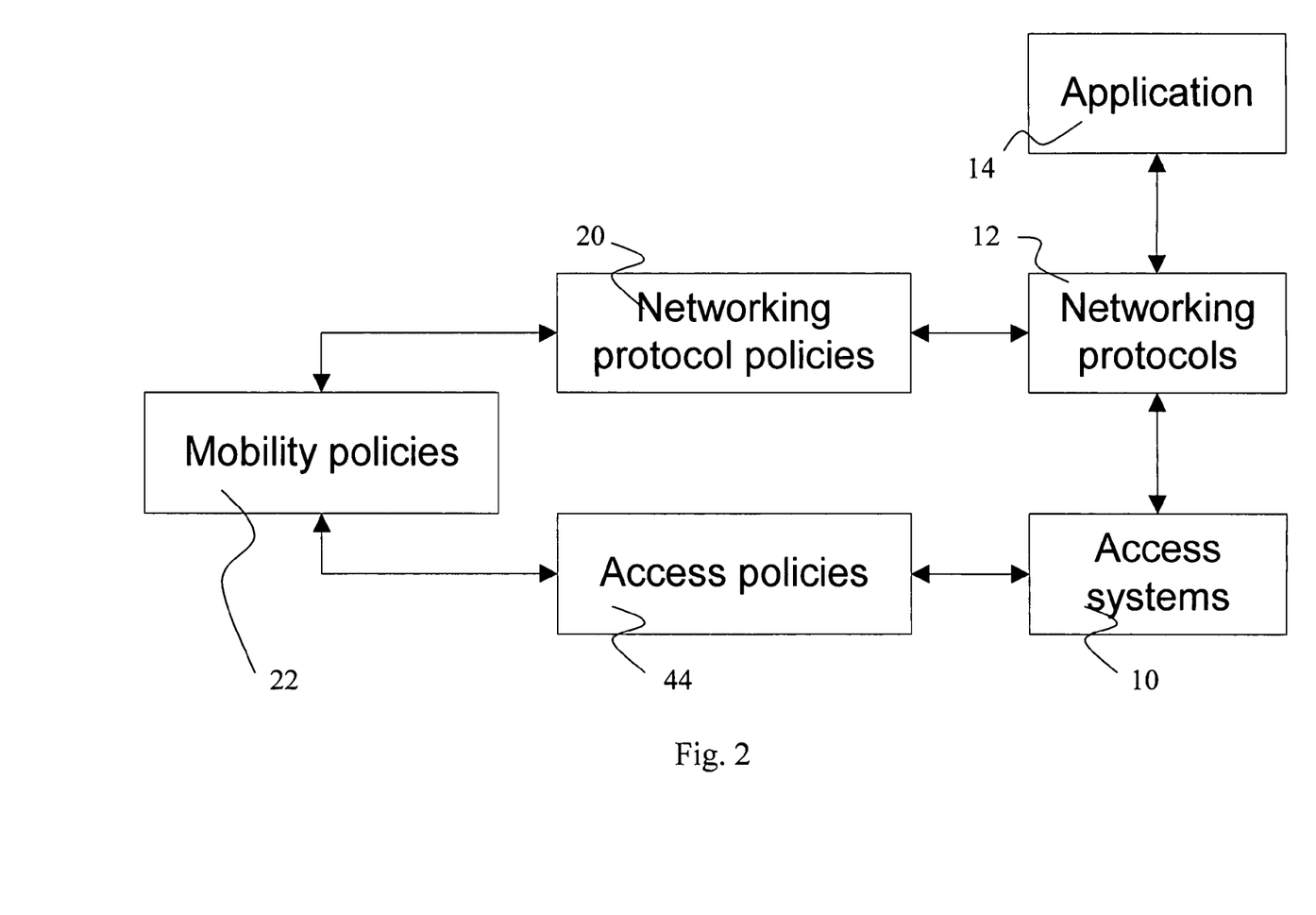
FIG. 2 shows a chart of functional blocks in accordance with an embodiment.

Turning now to embodiments wherein an appropriate interface is selected, a reference is first made to FIG. 2 showing an embodiment wherein automated connectivity decisions are made in a mobile device by means of separated selection processes. Each one of the selection processes is executed in respective selection entity. Each of the selection entities is adapted to execute a routine that considers at least one predefined policy directed to particular aspects of the available communication interfaces.

More particularly, FIG. 2 shows a networking protocol policy entity, mobility policy entity and an access policy entity. These entities of the mobile device each adapted to consider a different aspect of communication interfaces may be located in their own respective modules 20, 22, and 24. Selection of a suitable communication interface can then be based on information collected from each of these modules.

As shown by the double headed arrows, the modules 20, 22 and 24 are connected to each other and may interact during the decision-making process.

It is noted that the functionalities of the policy controlling entities may be combined into one or two modules or distributed across several modules.

The access technology i.e. communication interface selection may be based on a predefined networking policy or policies that is directed in considering the communication protocols and services that lie behind the available access technologies. An appropriate networking policy narrows down the list of possible access technologies that allow connection to a desired service. The final access technology selection can then be made based on mobile device system information and user preferences. The access technology selection may also be based on a predefined networking policy or policies directed in considering the communication requirements of a flow. An appropriate networking policy may receive flow requirements from an application. The requirements may also be obtained from networking protocols. For example, the IP Diffserv can be used to reveal required priority information, QoS information and so on. Flow requirements may also be decided based on flow information, like used source or destination port number. For example, a FTP service may be decided based on TCP port number, the FTP characteristics (which may be non-real-time, high bit-rate, reliable, delay-tolerant, and so on), or by investigating used protocols (RTP header means delay sensitive traffic). The final access technology selection can then be made based on flow requirements.

Different functional decision levels can be introduced in the control software of the mobile device to automate the connectivity decisions. The purpose of the different decision levels is to perform the decision-making process in functional locations that have enough and detailed information readily available for the decision-making. A networking policy may know, for example, IP level flow, protocol and service information. An access policy is not necessarily capable of handling IP protocols, but it may be able to handle, for example, the EDGE PDP context logic. Therefore networking policy is executed on the IP level rather than at the EDGE (access) level. Thus the term "locations" can be understood to mean that a certain policy functionality is located such that it can interwork with a certain system functionality.

The levelled decision making process may also assist in keeping the design modular.

A process for selecting an access technology can be based on detecting available interfaces, detecting if a virtual private network (VPN), a mobile IP (MIP) network or any other required protocol or service is available, and checking mobility policy settings. The bearer switching may then be done "seamlessly" with the help of the MIP or VPN. Seamless handovers are enabled between systems by the MIP because applications on mobile device can use the same IP address despite of used interface. A VPN may be considered by the selection process to provide seamless operation such that, for example, decreased radio security is compensated appropriately by VPN, and therefore satisfies the criteria. If no MIP or mobility enabled VPN is available, so called "hard roaming" may occur. An example of hard roaming is when a mobile device activates a WLAN connection and moves flow from a EDGE connection to the WLAN connection, this resulting to a change of the IP address. The application has then to establish a new TCP connection because of the changed IP address, since otherwise data cannot be transferred, or the application may stop working because of the changed IP address.

In this example the highest level of policy decision making entity is close to networking protocols 12 such that necessary sharing of information can be ensured. An access policy entity does not need to be close to the networking protocols because these entities do not need to share information directly. The networking protocols can include, for example, protocols such as the Internet Protocol (IP), Mobile-IP, Transport Control Protocol (TCP), User Datagram Protocol (UDP), Stream Control Transmission Protocol (SCTP) and so on. This level of decision making is referred to in the following by the term "networking protocol policy", and is denoted by controller block 20 in FIG. 2.

The networking protocol policy controller 20 may include a plurality of policies defining routing limitations for different destinations and services. Let us consider an example of a corporate email where a virtual private network (VPN) can be used for a connection. A VPN solution is typically the subject of various security restrictions. The networking protocol policy controller 20 may be adapted to decide if a direct connection without a VPN or a connection using the VPN that may need a connection to a security gateway of the organisation shall be used. For the direct connection a WCDMA network might be a candidate, in which case the WCDMA network provides required security and Quality of Service (QoS) levels and the WCDMA network may have secure connection to organisation network. For a VPN connection, the networking protocol policy controller 20 may have information that some access networks provide connectivity to the domain of the organisation that contains a required security gateway. Some other access networks might not provide access to said domain, for example because of Firewalls, name (or network) address translations (NATs) and so on. Thus connection to the security gateway would fail. As a result, the networking protocol policy controller 20 may provide a list of candidate access networks that may be used for the connection so that the security requirements are satisfied and connection to the required protocols and services is guaranteed, and provide the list to the next level of the decision making.

The networking protocol policy controller 20 may also include flow requirement logic for flows. The networking protocol policy controller 20 may receive flow requirements directly from applications via a special application program interface (API). The networking protocol policy controller may also receive flow requirements from used protocols, for example from the IP (for example related to DiffServ). The networking protocol policy controller 20 may also be able to determine flow requirements. For example, when a flow uses a certain port number (e.g. File Transfer Protocol; FTP or World Wide Web; WWW), service or protocol (Real-Time Transport Protocol; RTP), the networking protocol policy controller 20 may determine flow requirements and provide the requirements to the next level of the decision making. For example, real-time traffic does not tolerate delays and thus a GPRS network might not be acceptable for the flow.

The networking protocol policy controller 20 may also include pre-selection of network interface to be used for a connection. For example, GPRS, WLAN, WCDMA may be indicated as being preferable if such an interface is already available and active. The networking protocol policy controller 20 may decide that a new connection created by an application is directed to an existing interface because the connection fulfils defined networking protocol policies. An example of this is when a user launches a browser and starts connecting to a certain http address, the browser may make tens of Transport Control Protocol (TCP) connections. The networking protocol policy controller 20 may then decide to route all the flows over the same network interface.

A possible next level policy controller entity is a mobility policy controller 22. Thus, if the networking protocol policy controller 20 is unable to determine over which interface a connection should be routed or if there is no available interface when a connection is started, the networking protocol policy controller 20 may request the mobility policy controller 22 to choose an interface for the connection. The networking protocol policy controller 20 may provide a candidate interface list and/or flow requirements to the mobility policies controller 22. The candidate interface list and/or flow requirements may be left empty to denote that all interfaces are allowed. Based on the candidate interface list and based on the mobility policy information, the mobility policy controller 22 may then choose an interface to be used for the connection instead of a selection by the networking policy controller 20.

The mobility policy controller 22 may manage features such as user preferences, application preferences and system information. User preferences may include parameters such as general connectivity price limitations, coverage requirements, battery consumption rules (or power in general), QoS limitations, for example relating to high/mean/average bit-rate, delay, reliability, and other parameters that provide common framework for interface selection. Application preferences may include application specific preferences, such as the QoS and service description. System information include information such as interface availability, location and battery capacity level. The latter may be important especially in association with the WLAN interface usage as this is known for high power consumption, and usage thereof may not be desired if the remaining battery capacity is low. Other parameters, such as mobile terminal restrictions for multiple interface usage may also be considered. For example, the restrictions may depend on the model of the mobile device. Any other appropriate system level information may also be utilised in the decision making process.

The mobility policy controller 22 may then request an access policy controller 24 to activate the chosen access technology provided by an access system 10. The mobility policy controller 22 may also notify the networking protocol policy controller 20 about the selected interface so that the networking protocol policy controller 20 is able to route application data to correct access technology. Once an access technology is activated, for example an EDGE PDP context is activated, negotiated QoS parameters, assigned IP address etc. parameters may be communicated from the selected access technology to networking protocols and applications. For example, an IP address assigned to a PDP context is used by IP protocol and QoS may be used by the whole system, including applications, to provide required treatment for the flow.

The mobility policy controller may also request an access policy controller to add a flow to an already active access technology.

When an access policy controller 24 receives an access technology activation or usage request from the mobility policy controller 22, the access policy controller 24 maps the request to access technology specific policy decisions. The usage request is for adding a flow to an already active access technology. The access policy controller 24 can thus be used to manage the used access technology i.e. the interface specific policies and information. Such information may be definition of interfaces that can be active simultaneously (for example not to cause interference or run out of CPU capacity or memory) and also interface specific information, like characteristics of active PDP contexts.

The access policy controller 24 defines a mechanism for managing connectivity decisions for specific access technologies. The access policy controller entity may hide access technology specific decisions from the mobility policy controller and the networking protocol policy controller entities.

The operation of the access policy controller can be clarified by the following examples. If a WLAN is inactive, the mobility policy controller 22 may request for activation of the WLAN, where after the access policy controller 24 initiates activation of the WLAN. In another example, if a GPRS network is already active with one PDP context, the mobility policy controller 22 may request for increase of bit-rate transferred over the GPRS network because of the new connection that would need to start using the GPRS network. The access policy controller 24 has then to decide if an existing GPRS connection and PDP context configuration should also be used for the new connection, if an existing PDP context should be modified, for example to initiate increased bit-rate negotiation with the network, or if creation of a new PDP context for the new connection shall be initiated. In a third example a WCDMA connection is active with a PDP context. A mobile conferencing application starts with audio and video streaming and presentation sharing applications. The access policy controller 24 may be used to decide if a normal WCDMA is enough for the connection or if a WCDMA high speed downlink packet access (HSDPA) shall be used instead. If the latter decision is made, the access policy controller 24 may then initiate a WCDMA HSDPA activation routine to provide the service required by the mobile conferencing application and other applications.

An access policy controller may also provide monitoring of interfaces. For example, when a mobility policy controller prefers a WLAN but no WLAN is available, the mobility policy controller might request the access policy controller to monitor for availability of a WLAN. The access policy controller might then initiate scheduling of different interfaces already active to enable monitoring for a WLAN interface. Scheduling of interfaces means that some active interfaces might be put on hold for the WLAN monitoring purposes. When a WLAN becomes available, the access policy controller notifies the mobility policy controller thereof. The mobility policy controller may then decide to change one or more connections to be carried over the WLAN.

It is noted that these policies are not limited to wireless interfaces but could also be used to control fixed interfaces, for example an Universal Serial Bus (USB) or Ethernet.

Entities providing the networking protocol policies, mobility policies and access policies may include all functionalities as described above. It is noted that additional functionalities may be added to them and that some functionalities above may be unnecessary in certain applications, and are thus not needed to be provided. A functionality described as a part of one policy entity may be implemented as part of another policy entity. For example, an application connectivity requirement might as well be implemented as a part of networking protocol policies instead of mobility policies. As explained above, the decision entities 20, 22 and 24 of FIG. 2 are provided with distinct functionalities. For example, the networking policy may be located closely to the IP stack and thus when a browser that makes several TCP connections is opened, the networking policy may choose access technology for the TCP connections and therefore global policy controller components may not be loaded by the decision making, this assisting in modularization and performance optimization.

Figure 3:
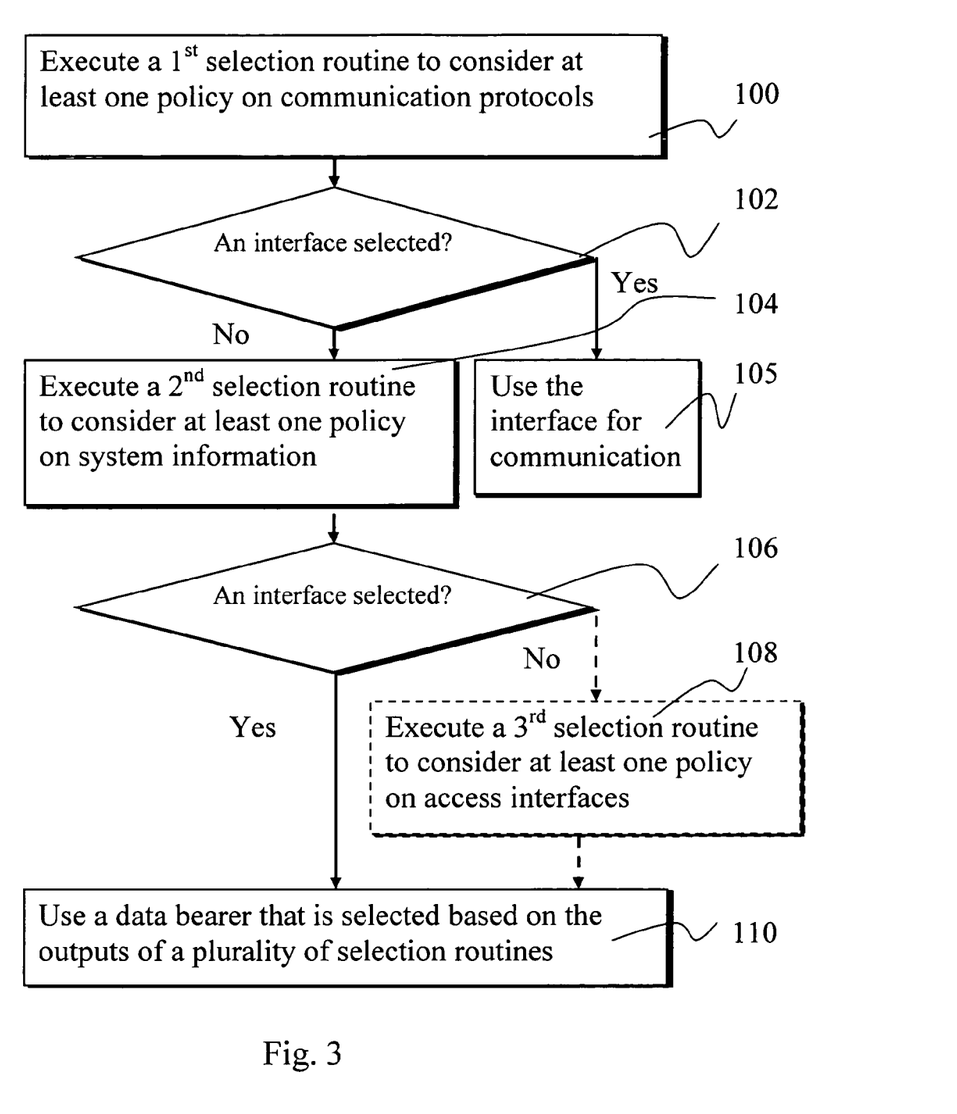
FIG. 3 is a flowchart in accordance with an embodiment.

FIG. 3 shows a flowchart in accordance with an embodiment for automated selection of a communication interface for a communication device. More particularly, FIG. 3 shows an embodiment how a communication interface can be selected based on outputs of a plurality of selection routines step 110 in hierarchical manner such that the output of a selection routine is used as an input of a next selection routine, and if required, the output of the next selection routine is used as an input of a yet further selection routine, and so forth.

If a connection needs to be established, a first selection routine is executed in a first controller entity at step 100 to consider at least one predefined policy on communication protocols. This may be performed as explained above with reference to networking protocol policies block 20. If it is determined in step 102 that it is not possible to select a communication interface, a request is sent to a second controller entity for execution of another selection routine at step 104. If an interface can be selected already at this phase, then this interface may be used for communication, see step 105. The first controller entity may output a list of candidates and/or any other appropriate information, like flow requirements, that may then be input into the second selection routine.

The second selection routine executed at the second controller entity at step 104 may then consider at least one predefined policy on system information. Example of possible system information to be considered are explained above with reference to mobility policies block 22.

In FIG. 3, at step 106, the mobility policy has chosen an interface. The interface may then be used as such and there may be no need to communicate information to other policies, for example to an access policy. If the interface need to be activated, monitored or modified, an access policy may need to be involved. Access policy can be used to map mobility policy requirements to access technology specific requirements, for example one or more PDP contexts, QoS defined for the radio access, and so on. Therefore, in certain embodiments at least one further selection routine may be desired. In FIG. 3 this is shown by the optional step 108 of executing a third selection routine for considering at least one policy on access interfaces for mapping the policy requirements to access technology specific requirements.

It is noted that networking policy, mobility policy and access policy may be executed in different order than shown in the Figures and described above. For example, the mobility policy may be done first and only then apply networking policy. It is thus first decided which interfaces are usable and only then networking policy may select one of the candidate interfaces that fills networking requirements. The policies may also be executed in parallel, this being an implementation level issue.

In addition, a networking protocol policy may have a logic to determine if an application is unable to reach the services it requires. In such a case, networking protocol policy may exclude the access technology used currently for an application flow or flows from the candidate access technologies list resulting in choosing another access technology for the application flow or flows. For example, in case a WLAN connection has been activated for an application flow but the WLAN network is unable to provide connectivity to required services, for example because of a Firewall along the route, the networking policy might notice the situation and exclude the used WLAN network from the list of candidate access technologies resulting in selection of a different WLAN network or a different access technology. Networking protocol policy may notice the situation, for example, through communication with networking protocols or the application may provide the required information.

In accordance with a further embodiment, a further data processing mechanism for selection of a communication interface for a communication device from a plurality of already selected communication interfaces is provided in a communication system where plurality of controlling entities participate in the communication interface selection routine. The mechanism comprising a controller entity for executing a local communication interface selection from a group of already selected and activated communication interfaces. The selection is based on information of at least one policy on communication via the communication system the local entity may have.

The required data processing functions of the mobile device may be provided by means of one or more data processors. Appropriately adapted computer program code product may be used for implementing the embodiments, when loaded to the mobile device, for example a processor of the mobile device. The program code means may, for example, perform the selection operations, generation of messages and/or information elements, interpretation of information and so forth. The program code product for providing the operation may be stored on and provided by means of a carrier medium such as a carrier disc, card or tape. A possibility is to download the program code product to the mobile device via a data network.

It is noted that whilst embodiments of the present invention have been described in relation to devices such as mobile terminals, embodiments of the present invention are applicable to any other suitable type of devices suitable for communication via a communications network.

It is also noted that the policy decision parameters discussed are only examples, and that any parameters may be employed by a hierarchical mechanism.

It is noted that even though the exemplifying embodiments shown and described in this disclosure use the terminology of the 3$^{rd}$ generation (3G) WCDMA (Wideband Code Division Multiple Access) networks, such as UMTS (Universal Mobile Telecommunications System), CDMA2000 systems and wireless local area networks, embodiments of the proposed solution can be used in any communication system wherein advantage may be obtained by means of the embodiments of the invention. The selection may also be made between wireless and fixed access.

It is also noted herein that while the above describes exemplifying embodiments of the invention, there are several variations and modifications which may be made to the disclosed solution without departing from the scope of the present invention as defined in the appended claims.

The invention claimed is:

1. An apparatus, comprising:
   at least one memory including computer program code;
   at least one processor,
   wherein the at least one memory and computer program code are configured to, with the at least one processor, cause the apparatus at least to
   execute a first selection routine configured to consider selection of a communication interface for an application on a communication device on the basis of a network protocol policy,
   provide a candidate interface list, if the application is unable to reach services the application requires,
   excluding access technologies used currently from the candidate interface list,
   output from one selection routine at least one of a list of candidate communication interfaces or flow requirements,
   input the list into another selection routine,
   execute a second selection routine configured to consider selection of the communication interface on the basis of output of the first selection routine and at least one of user equipment system information, user preferences and application preferences, and
   select the communication interface based on an output of the second selection routine, wherein the apparatus comprises or is comprised in a user equipment.

2. The apparatus of claim 1, wherein the at least one memory and computer program code are configured to, with the at least one processor, cause the apparatus at least to select the communication interface by narrowing down a list of candidate access technologies based on requirements of a service.

3. The apparatus of claim 1, wherein the at least one memory and computer program code are configured to, with the at least one processor, cause the apparatus at least to select the communication interface based on data flow requirements.

4. The apparatus of claim 1, wherein the communication interface is provided by any one of a general packet radio service network, a code division multiple access network, a wideband code division multiple access network, a global system for mobile communication network, an enhanced data rate global system for mobile communication network, an ultra wide band, a short range link, and a wireless local area network.

5. An apparatus, comprising:
   at least one memory including computer program code;
   at least one processor,
   wherein the at least one memory and computer program code are configured to, with the at least one processor, cause the apparatus at least to
   execute a first selection routine configured to consider selection of a communication interface for an application on a communication device on the basis of a network protocol policy,
   provide a candidate interface list, if the application is unable to reach services the application requires, excluding access technologies used currently from the candidate interface list,
   execute a second selection routine configured to consider selection of the communication interface on the basis of the candidate interface list and at least one of user equipment system information, user preferences and application preferences, execute a third selection routine configured to consider an access technology policy, and select the communication interface based on an output of the third selection routine, wherein the apparatus comprises or is comprised in a user equipment.

6. The apparatus of claim 5, wherein one of the first selection routine, the second selection routine, and the third selection routine is configured to consider at least one policy on communication protocols.

7. The apparatus of claim 5, wherein one of the first selection routine, the second selection routine, and the third selection routine is configured to consider at least one policy on flow requirements.

8. The apparatus of claim 5, wherein one of the first selection routine, the second selection routine, and the third selection routine is configured to consider at least one policy on access interfaces.

9. The apparatus of claim 5, wherein one of the first selection routine, the second selection routine, and the third selection routine is configured to consider parameters associated with a communication device.

10. The apparatus of claim 5, wherein one of the first selection routine, the second selection routine, and the third selection routine is configured to consider parameters associated with at least one of connectivity, pricing, power source, quality of service, and a type of a communication device.

11. The apparatus of claim 5, wherein one of the first selection routine, the second selection routine, and the third selection routine is configured to consider at least one of the internet protocol, mobile internet protocol, transport control protocol, and stream control transmission protocol.

12. The apparatus of claim 5, wherein the at least one memory and computer program code are configured to, with the at least one processor, cause the apparatus at least to activate the communication interface.

13. An apparatus, comprising:
a first control means for executing a first selection routine for considering selection of a communication interface for an application on a communication device on the basis of a network protocol policy, the first control means being further for providing a candidate interface list, for determining if the application is unable to reach services the application requires and for excluding access technologies used currently from the interface list; and
a second control means for executing a second selection routine for considering selection of the communication interface on the basis of output of the first selection routine and at least one of user equipment system information, user preferences and application preferences,
wherein the apparatus is configured to select the communication interface based on an output of the second selection routine, to output from one selection routine at least one of a list of candidate communication interfaces or flow requirements and to input the list into another selection routine, and wherein the apparatus comprises or is comprised in a user equipment.

14. The apparatus of claim 13, wherein the apparatus comprises a mobile device.

15. The apparatus of claim 13, wherein the second control means is for notifying the first controller entity of a selected communication interface, and the first control means is for routing application data to the third controller entity.

16. The apparatus of claim 13, wherein one of the first control means, the second control means, and the third control means is for monitoring for availability of the communication interface, and for notifying at least one of the first control means, the second control means, and the third control means of an available communication interface.

17. The apparatus of claim 13, wherein one of the first control means, the second control means, and the third control means is provided by a networking policy controller of a communication device.

18. The apparatus of claim 13, wherein one of the first control means, the second control means, and the third control means is provided by a mobility policy controller of a communication device.

19. The apparatus of claim 13, wherein one of the first control means, the second control means, and the third control means is provided by an access policy controller of a communication device.

20. A method, comprising:
executing a first selection routine configured to consider selection of a communication interface for an application on a communication device on the basis of a network protocol policy;
providing a candidate interface list;
determining if the application is unable to reach services the application requires;
excluding access technologies used currently from the candidate interface list;
outputting from one selection routine at least one of a list of candidate communication interfaces or flow requirements,
inputting the list into another selection routine,
executing a second selection routine configured to consider selection of the communication interface on the basis of the output of the first selection routine and at least one of user equipment system information, user preferences and application preferences; and
selecting the communication interface based on an output of the second selection routine, wherein the method is performed in a user equipment.

21. The method of claim 20, wherein the executing of the first selection routine comprises considering at least one policy on communication protocols.

22. The method of claim 20, wherein the executing of the first selection routine comprises considering at least one policy on flow requirements.

23. The method of claim 20, wherein the executing of the second selection routine comprises considering a predefined policy on parameters that associate with a communication device.

24. The method of claim 20, further comprising:
generating an empty list to denote that all available interfaces are allowed.

25. The method of claim 20, further comprising:
selecting, by at least one of the first selection routine and the second selection routine, a communication interface from already activated communication interfaces.

26. The method of claim 20, further comprising:
selecting, by at least one of the first selection routine and the second selection routine, a communication interface from a group of preferable communication interfaces when such an interface is available.

27. The method as claimed in claim 20, further comprising:
sending a request to the second selection routine to select the communication interface when the first selection routine is unable to output a communication interface that shall be used by a communication device.

28. The method of claim 20, further comprising:
narrowing down a list of candidate access technologies based on requirements of a service.

29. The method of claim 20, further comprising:
selecting a communication interface based on data flow requirements.

30. The method of claim 20, wherein the second selection routine is executed before execution of the first selection routine.

31. The method of claim 20, further comprising:
monitoring for availability of communication interfaces.

32. The method of claim 20, wherein the communication interface corresponds to a communication device that comprises a mobile device.

33. A method, comprising:
executing a first selection routine configured to consider selection of a communication interface for an application on a communication device on the basis of a network protocol policy;
providing a candidate interface list;
determining if the application is unable to reach services the application requires;
excluding access technologies used currently from the candidate interface list;
executing a second selection routine configured to consider selection of the communication interface on the basis of the candidate interface list and at least one of user equipment system information, user preferences and application preferences; and
executing a third selection routine configured to consider at least one third policy on communication via the communication system, the at least one third policy being related to a different aspect of communication than the at least one first policy and the at least one second policy; and
making a decision regarding the selection based on a output of the third selection routine, wherein the method is performed in a user equipment.

34. The method of claim 33, wherein the executing of the third selection routine comprises considering at least one policy on access interfaces.

35. A method, comprising:
executing a first selection routine configured to consider selection of a communication interface for an application on a communication device on the basis of a network protocol policy;
providing a candidate interface list;
determining if the application is unable to reach services the application requires;
excluding access technologies used currently from the candidate interface list;
executing a second selection routine configured to consider selection of the communication interface on the basis of the candidate interface list and at least one of user equipment system information, user preferences and application preferences;
analyzing, by at least one of the first selection routine and the second selection routine, which, when any, of the possible communication interfaces satisfy a security policy; and
selecting the communication interface based on an output of the second selection routine, wherein the method is performed in a user equipment.

36. A program code product embodied within a non-transitory computer readable medium and configured to control a processor in a user equipment to perform operation comprising:
executing a first selection routine configured to consider selection of a communication interface for an application on a communication device on the basis of a network protocol policy;
providing a candidate interface list;
determining if the application is unable to reach services the application requires;
excluding access technologies used currently from the candidate interface list;
outputting from one selection routine at least one of a list of candidate communication interfaces or flow requirements,
inputting the list into another selection routine,
executing a second selection routine configured to consider selection of the communication interface on the basis of output of the first selection routine and at least one of user equipment system information, user preferences and application preferences; and
selecting a communication interface based on an output of the second selection routine.

* * * * *